United States Patent [19]
Tsujimoto et al.

[11] 3,792,484
[45] Feb. 12, 1974

[54] AUTOMATIC FLASH CONTROL DEVICE
[75] Inventors: Kayoshi Tsujimoto, Osaka;
Yoshifusa Fujii, Kaizuka, both of Japan
[73] Assignee: Minolta Camera Kabushiki Kaisha Osaka-Shi, Osaka-fu, Japan
[22] Filed: May 11, 1971
[21] Appl. No.: 142,154

[30] Foreign Application Priority Data
May 11, 1970 Japan.............................. 45-39877

[52] U.S. Cl................ 95/10 C, 95/10 CE, 95/64 R
[51] Int. Cl.......................................... G03b 15/05
[58] Field of Search...95/10 C, 10 CE, 10 CT, 10 CD, 95/11.5 R, 64 R

[56] References Cited
UNITED STATES PATENTS
3,296,947   1/1967   Engelsmann et al............ 95/11.5 X
3,350,603   10/1967  Erickson ...................... 95/11.5 UX
3,498,192   3/1970   Ito et al. ................................. 95/10
3,578,765   5/1971   Koleayashi et al...................... 95/10

Primary Examiner—Samuel S. Matthews
Assistant Examiner—Michael L. Gellner
Attorney, Agent, or Firm—Watson, Cole, Grindle & Watson

[57] ABSTRACT

An automatic diaphragm aperture control device and an automatic flash control device are combined to effect termination of flash firing by adjusting a threshold level in accordance with a light measuring circuit including a first light receiving element. A second light receiving element in the diaphragm aperture control device adjusts the diaphragm aperture in accordance with the intensity of light and also adjusts the threshold for terminating flash firing in accordance with the light intensity measured by the second light receiving element.

7 Claims, 4 Drawing Figures

INVENTORS
Kayoshi Tsujimoto
Yoshizusa Fujii
BY
Watson, Cole, Grindle & Watson

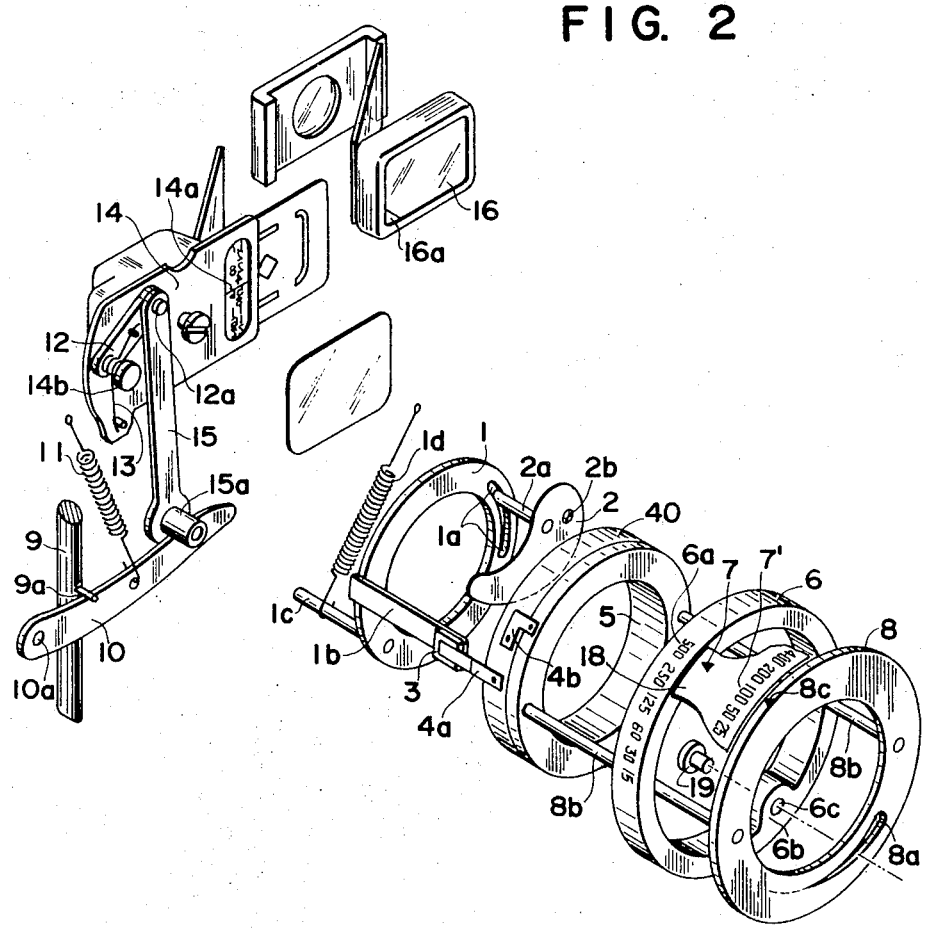

AUTOMATIC FLASH CONTROL DEVICE

BACKGROUND OF THE INVENTION

The present invention relates to an automatic flash control device, and more particulary to such device which device automatically controls the exposure with good balance for the background and an object especially regardless of the light and dark contrast of the objective field, by illuminating the object in the objective field.

Up to the present time cameras effect the automatic flash exposure control by controlling the radiation time of the electronic flash by means of the shutter exposure control circuit. In such a camera the diaphragm is set up beforehand and the integrated value of light from the objective field including an object illuminated by an electronic flash controls the exposure time in accordance with the time taken to reach a threshold level adjusted in accordance with the diaphragm setting.

Therefore, no consideration is made for the brightness of the background portion of the objective field, and in the case where the background portion is very light such as in taking a picture against the light or in the case where the background is very dark the proper exposure can not be obtained for the background.

OBJECT OF THE INVENTION

One object of the present invention is to remove the prior drawbacks mentioned above and provide an automatic flash control device for obtaining the proper exposure for both the background in the objective field and an object illuminated by an electronic flash.

Another object of the present invention is to provide an automatic flash control device for attaining the aforesaid object and at the same time effecting shutter speed preferential diaphragm control or a programmed control for the shutter speed and the diaphragm in daylight photographing.

Still another object of the present invention is to provide an automatic flash control device for obtaining the proper exposure for both the background in the objective field in flash photographing and an object illuminated by an electronic flash in accordance with the film sensitivity.

Other objects and advantages of the present invention will be apparent from the detailed description of the invention described hereinafter.

SUMMARY OF THE INVENTION

In order to attain the above-mentioned objects the present invention is so constructed that the shutter speed is set up beforehand and a shutter speed preferential automatic diaphragm control device automatically controls the diaphragm setting in accordance with the lightness of the objective field by means of a light receiving element for receiving light from the entire objective field an automatic control device automatically controls the shutter speed and the diaphragm setting which are programmed beforehand. An automatic flash device stops the lighting of the electronic flash when the time integrated light output of the light receiving element level, which control level is automatically adjusted by the diaphragm setting which is also controlled automatically by the flash device. The exposure is fixed by establishing the proper diaphragm setting corresponding to the exposure time with respect to the lightness of the background by means of the former. The flash time of the electronic flash is controlled by the illumination of the object to fix the proper exposure, so as to control the exposure in good balance with respect to the whole picture.

BRIEF DESCRIPTION OF THE DRAWINGS

FIG. 2 is an exploded perspective view of the essential elements of the embodiment.

DESCRIPTION OF THE PREFERRED EMBODIMENT

Figure 1:
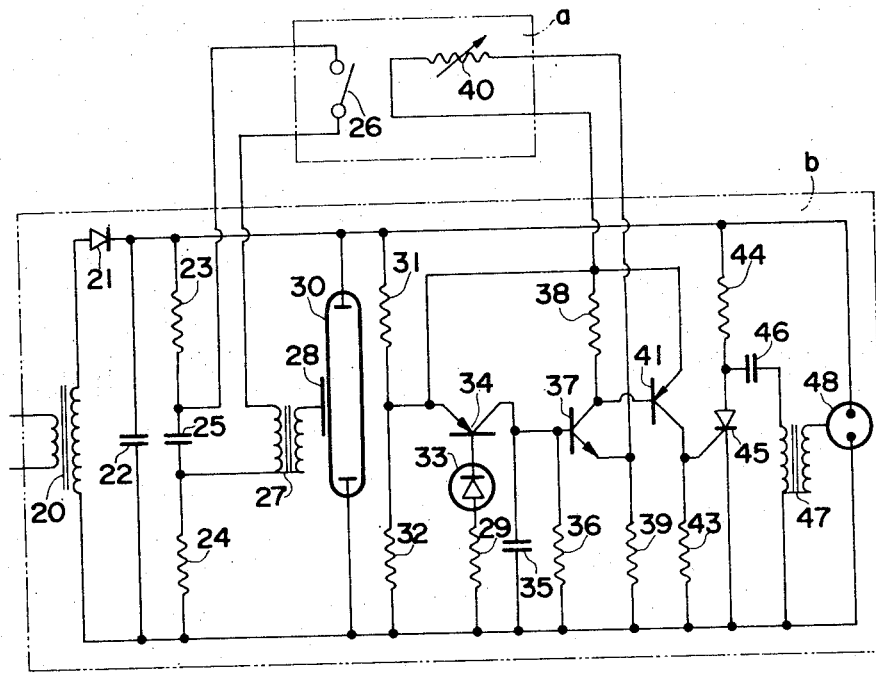
FIG. 1 is a circuit diagram of an embodiment in accordance with the present invention.

In the circuit diagram shown FIG. 1, capacitor 22 for lighting an electronic flash tube, trigger capacitor 25 in series with resistances 23, 24, synchro switch 26 (in camera body a) in parallel with trigger capacitor 25 are connected to the secondary circuit of step-up transformer 20 in electronic flash device b. In flash device b there are also the primary winding of transformer 27, trigger electrode 28 of electronic flash tube 30 connected to the secondary winding of transformer 27, and electronic flash tube 30 connected in parallel with capacitor 22 for lighting the electronic flash tube. And, to the node between resistances 31, 32 connected in parallel with electronic flash tube 30, the emitter of transistor 34 and the emitter of transistor 41 are connected. One end of step-up transformer 20 is connected via photocell 33 and adjusting resistance 29 to the base of transistor 41 and to the collector of transistor 34, capacitor 35 and resistance 36 in parallel with capacitor 35 are connected. That collector is connected also to the base of transistor 37. And, between the collector of transistor 37 and the emitter of transistor 34 adjusting resistance 38 is inserted and between the node thereof and the emitter of transistor 37 variable resistance 40 is inserted in the camera body a by using a lead wire extending to the side of the camera body. Between the emitter of transistor 37 and one end of step-up transformer 20 resistance 39 is inserted. The collector of transistor 37 is connected to the base of transistor 41 and the collector of transistor 41 is connected to the gate electrode of thyristor or silicon control rectifier 45 and also to one end of step up transformer 20 via resistance 43. The anode of thyristor 45 is connected to one end of step-up transoformer 20 and the cathode thereof is connected to capacitor 46 and to the other end of step-up transformer 20 via resistance 44. Capacitor 46 is connected to the primary winding of transformer 47 and the secondary winding of transformer 47 is connected to the trigger electrode of discharge tube 48 which has a low internal resistance. The discharge electrode of discharge tube 48 is connected to step-up transformer 20.

Therefore, upon closing synchro switch 26 the charging current of trigger capacitor 25 flows through the primary winding of transformer 27. By means of the secondary voltage thereof electronic flash tube 30 starts to discharge charged capacitor 25 and is energized. The reflected light from the object produces a voltage in photocell 33 and causes transistor 34 to start to charge capacitor 35. When the charging voltage of capacitor 35 reaches a certain value transistor 37 is switched into conduction, however, the base voltage at the time when it switches is determined by the potential of its emitter. And, the potential of its emitter is fixed by the ratio of the resistances of variable resistance 40 and resistance 39. Since transistor 37 and simultaneously therewith transistor 41 are conductive thyristor 45 is energized, the charging current of capacitor 46 flows through the primary winding of transformer 47 and by means of the voltage induced in the secondary winding thereof the discharge of discharge tube 48 is started. The internal resistance of discharge tube 48 is very low as compared with the internal resistance of electronic flash tube 30, so that the charging current of capacitor 22 ends the discharge at once, and accordingly electronic flash tube 30 radiates light. In summary, the signal related to the reflected light from the object is integrated by capacitor 35 and the level at which transistor 37 is switched by the charging voltage of capacitor 35 is adjusted by the resistance of variable resistance 40.

FIG. 2 shows the mechanism for interlocking variable resistance 40 with the diaphragm setting of the camera, wherein reference numeral 1 denotes a diaphragm adjusting ring provided with slot 1a in which pin 2a of diaphragm blade 2 is (in the drawing only one is shown) supported rotatably by pin 2b on the diaphragm case body. Diaphragm adjusting ring 1 is provided with projection member 1b and connecting pin 1c, and on projection member 1b movable contact 4a is held via insulating material 3. Spring 1d is provided on pin 1c to fully open the diaphragm by turning it clockwise.

On camera barrel 18 in front of diaphragm adjusting ring 1, variable resistance ring 5, composed of an insulating material, is rotatably supported and on a portion of its periphery variable resistance 40 is coated. Movable member 4a and one end of fixed contact piece 4b fixed to the insulating material of variable resistance ring 5 are in contact with variable resistance 40.

In front of variable resistance ring 5 shutter speed ring 6 is rotatably supported and by aligning its speed scale 6a with index 7 provided on barrel 18 the shutter speed is fixed as is well known. On a portion of shutter speed ring 6 thick portion 6b is formed and opening 6c is provided thereon. On the rear end of opening 6c photoconductive element 19 is held (in FIG. 2 shown in separating) and formed so that the light from the entire objective field in the photographic picture angle enters through opening 6c.

In front of shutter speed ring 6 film sensitivity setting ring 8 is rotatably supported relative to barrel 18 and the film sensitivity is set by index 8c provided on its periphery and ASA scale 7' provided on barrel 18. On a portion of the periphery of film sensitivity setting ring comet shaped slit hole 8a is provided facing to opening 6c to adjust the incident light quantity the entire objective field to photoconductive element 19. And, film sensitivity setting ring 8 and variable resistance ring 5 are connected by connecting pin 8b to turn together.

Pointer 14a of exposure meter 14, to which the output of photoconductive element 19 is fed turns on scale plate 17 in finder 16 and is restrained in a turning position by well known means not shown in the drawings when shutter release button 9 is depressed.

Pin 9a provided projectingly on shutter release button 9 is pivoted by pin 10a on the camera main body and engages with lever 10 having a counter-clockwise turning tendency by spring 11.

And, to the other end of detection lever 12 pivoted by pin 14a on the case body of exposure meter 14 and having a clockwise turning tendency by weak spring 13, working lever 15 is pivoted as a bell crank by pin 12a. On the other end of working lever 15 working pin 15a is projectingly provided to engage with lever 10. Thus, when shutter release button 9 is depressed lever 10 is turned clockwise and accordingly detection lever 12 is turned clockwise by spring 13. Working pin 15a is moved along the guide slot on the camera (not shown in the drawing) to engage with connecting pin 1c. And until detection lever 12 engages with pointer 14a turned by photoconductive element 19 and restrained in its turning position in interlocking with depressed shutter release button 9, working pin 15a turns diaphragm adjusting ring 1 counter-clockwise against spring 1d and thereby the proper diaphragm setting for the entire objective field is automatically controlled relative to the shutter speed set in the state in which the flash is not lit. And thus, the proper diaphragm setting for the background is controlled.

In accordance with that control, movable contact 4a also is moved, and between fixed contact piece 4b and movable contact 4a the resistance value of resistance 40 is set. And thereby the lighting time can be controlled to an object illuminated by electronic flash tube 30 in the objective field. And yet, controls are both changed depending upon the sensitivity of the film used, however, by changing the film sensitivity the width of comet shaped slit hole 8a in front of opening 6c undergoes a change and in conformity therewith the amount of light incident from the entire objective field to photoconductive element 19 and the change of deviation angle of pointer 14a of exposure meter 14 is brought about. The controlled diaphragm opening is changed to the proper diaphragm setting for the background. At the same time variable resistance ring 5 is turned in interlocking with film sensitivity setting ring 8 and the arcuate space between fixed contact 4b and movable contact 4a, moving in accordance with the controlled diaphragm setting is changed, so that the resistance of resistance 40 undergoes a change and the switching level of transistor 37 to the charging voltage of capacitor 35 for integrating the light quantity is changed to adjust the lighting time of electronic flash tube 30.

Figure 3:
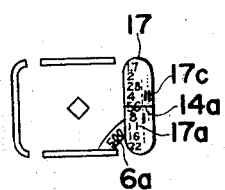
FIG. 3 shows the field of view in the view finder.
Figure 4:
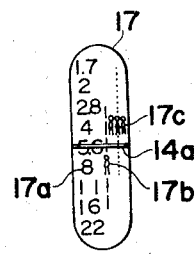
FIG. 4 is an enlargement of the scale plate shown in FIG. 3.

FIG. 3 and FIG. 4 show scale plate 17 and pointer 14a seen in the field of view in the camera finder, and the diaphragm setting controlled by pointer 14a is indicated by scale 17a of scale plate 17 and at the same time the limits capable of daylight flash photography is indicated thereby.

With respect to scale plate 17, human figure 17b represents photographic distance, for example, 1.25 m, and human figure 17c represents photographic distance, for example, 4 m. When pointer 14a is within the range of a respective dotted line it is an indication that flash control photography is possible. That is, when a film having an ASA sensitivity of 100 is used and the photographic distance is 1.25 m, if pointer 14a indicates a diaphragm aperture setting of between 5.6 to 16, flash control photography is possible. And, when the film sensitivity is changed, the scale indicating the human figures and the position of the dotted lines thereon on scale plate 17 can be moved relative to scale plate 17.

Moreover, when changing the shutter speed set beforehand, shutter speed ring 6 is turned and in the same way the relative positions of opening 6 and comet shaped slit hole 8a are changed, so that the quantity of light incident from the entire objective field to photoconductive element 19 undergoes a change. Accordingly as a matter of course the diaphragm value controlled by pointer 14a of exposure meter 14 undergoes a change, and as a result fixed contact 4b is motionless but movable contact 4a is moved to change the resistance of resistance 40 and also the discharge level of capacitor 35 for integrating the light quantity. Thus, the lighting time of electronic flash tube 30 is controlled.

In the above-mentioned embodiment, in the case where the objective field is very dark the diaphragm is as a matter of course controlled for full opening, however, in this case if the diaphragm is desired to be set at a desired diaphragm value it is also possible to set the diaphragm manually and stop diaphragm adjusting ring 1 in its position.

Further, this embodiment relates to a camera wherein the shutter speed is preferentially set up beforehand to control the diaphragm, however, as described hereinbefore the lighting control time of the electronic flash tube is so short — less than 1/1000 second — and quicker than the highest shutter speed of the camera, therefore, it is also possible to apply it to such a camera type wherein the shutter speed and the diaphragm setting are programmed beforehand and both are simultaneously controlled in accordance with the light from the entire objective field.

That is, with reference to FIG. 2, on shutter speed ring 6 scale "A" for controlling automatically the shutter speed is marked so as to be aligned with index 7, and further a control lever supported on the camera case body is provided to engage with projection 1b of diaphragm adjusting ring 1 so as to control the shutter speed when scale "A" is aligned with index 7.

And, for example, as shown in U.S. Pat. No. 3,126,801, with one set of blades the diaphragm and the shutter speed are simultaneously fixed the present invention can be carried out in such a manner that by a ring for operating only one set of blades resistance 40 is controlled.

In any of the embodiments mentioned above, the present invention enables the proper exposure to be automatically controlled to an object illuminated by an electronic flash tube along with the backgrounds in both sides.

What is claimed is:

1. In an apparatus for controlling exposure through cooperation of an automatic diaphragm aperture control device and an automatic flash control device, said flash control device, comprising:
a light measuring circuit having a first light receiving element for generating current in response to the intensity of light incident thereon;
means for integrating said current to provide an output signal;
first means responsive to said output signal for terminating flash firing when said output signal reaches a predetermined level; and said diaphragm aperture control device, comprising:
a second light receiving element receiving scene light;
a movable member for determining the aperture size as a function of the position thereof;
second means responsive to said second light receiving element for adjusting the position of said movable member in accordance with the intensity of light incident on said second light receiving element;
means for restraining said movable member in response to shutter release operation;
means for biasing said first responsive means to set said predetermined level; and
means for adjusting said biasing means in accordance with the position of said movable member.

2. Apparatus as in claim 1 wherein said second light receiving element measures the light intensity of the overall objective field and said first light receiving element measures the light intensity of a selected portion of said objective field.

3. Apparatus as in claim 1 wherein said means for biasing includes a variable resistance; said first means includes first and second transistors, said first transistor is responsive to said output signal and said variable resistance is connected to said first transistor to vary the switching level thereof, said second transistor is switched in response to the switching of said first transistor; said first means further includes means for shorting said flash device and trigger means actuated by said second transistor for energizing said means for shorting.

4. Apparatus as in claim 3 wherein said first means further includes a third transistor; said first light receiving element is connected to the base electrode of said third transistor, said means for integrating is a capacitor connected to the collector of said third transistor, the base electrode of said first transistor is connected to the collector of said third transistor, said variable resistance is connected to the collector of said first transistor, the base of said second transistor is connected to the collector of said first transistor, said trigger means is a silicon control rectifier with the gate thereof connected to the collector of said second transistor; said means for shorting is a discharge tube; and said flash device is a flash tube connected in parallel with said discharge tube.

5. Apparatus as in claim 3 further comprising a shutter speed setting member and a film sensitivity setting member; a ring member having mounted thereon said variable resistance; said movable member includes a contact element contacting said variable resistance; said film sensitivity setting member is connected to rotate with said ring member; and said shutter speed setting member is rotatable independently of said film sensitivity member.

6. Apparatus as in claim 5 wherein said film sensitivity setting member includes a variable slit; and said shutter speed setting member includes means for mounting said second light receiving element in alignment with said variable slit whereby the light incident on said second light receiving element varies in accordance witth the rotation of said film sensitivity setting member.

7. Apparatus as in claim 5 wherein said second means includes an exposure meter responsive to said second light receiving element and having a pointer indicating exposure conditions, means adjustable in accordance with the movement of said pointer, and said movable member includes means engaging said adjustable means whereby said movable member is rotated in accordance with the light measured by said second light receiving element.

* * * * *